United States Patent

[11] 3,543,920

| [72] | Inventors | Guy J. Crocker<br>North Brunswick;<br>Frank Puskadi, Edison, New Jersey |
|---|---|---|
| [21] | Appl. No. | 664,773 |
| [22] | Filed | Aug. 31, 1967 |
| [45] | Patented | Dec. 1, 1970 |
| [73] | Assignee | Johnson & Johnson<br>a corporation of New Jersey |

[54] PRINTABLE ADHESIVE PRODUCT
7 Claims, 4 Drawing Figs.

[52] U.S. Cl. ..................................................... 206/59;
117/14, 117/68.5, 117/76
[51] Int. Cl. ............................................................. C09j 7/02
[50] Field of Search ........................................... 117/68.5,
14, 76(A), 12; 206/59

[56] References Cited
UNITED STATES PATENTS
| 3,052,566 | 9/1962 | Smith | 117/68.5 |
| 3,285,771 | 11/1966 | Dabroski | 117/68.5 |
| 3,311,497 | 3/1967 | Park | 117/12X |

Primary Examiner—William D. Martin
Assistant Examiner—Bernard D. Pianalto
Attorneys—Alexander T. Kardos, Arnold S. Worfolk and Charles A. Harris ABSTRACT: A normally tacky and pressure-sensitive adhesive tape which is coated with a release composition to provide easy release from the roll on which it is wound, and yet possesses good printability on the surface of the release coating, itself. The release coating composition comprises a particular type of film former and release agent combination wherein the release agent enters into a stable phase relationship with a film former adjacent the outer surface of the release coat wherein both the release agent and the film former are effectively distributed at said surface in a substantially uniform and macroscopically continuous manner. The resulting release coating then may be printed with inks normally suitable for printing on the film former, per se, even though the presence of the release agent provides easy release from the roll on which the tape is wound.

Patented Dec. 1, 1970 3,543,920
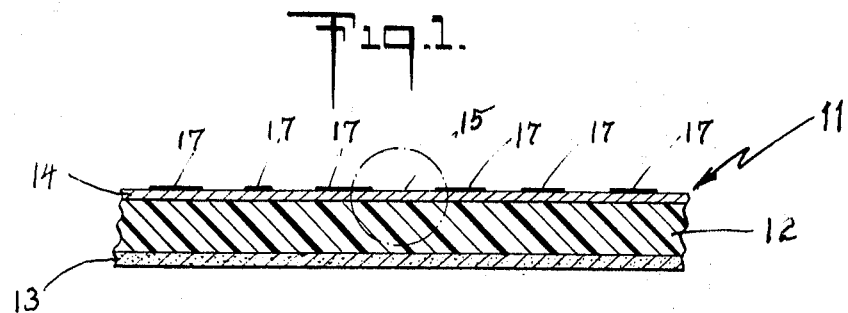
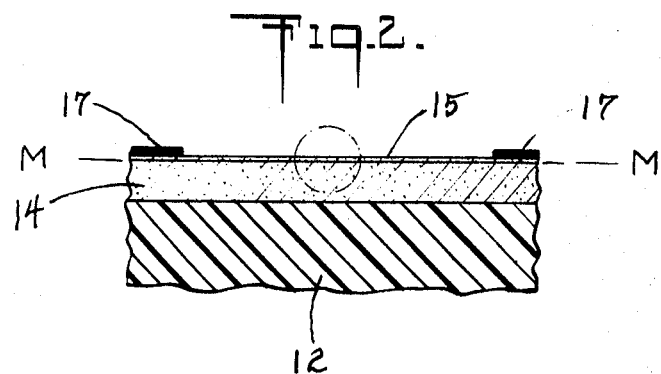
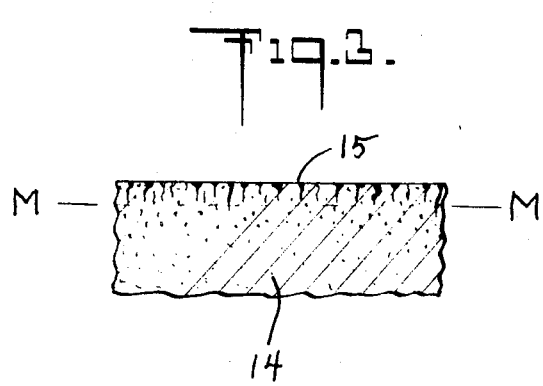
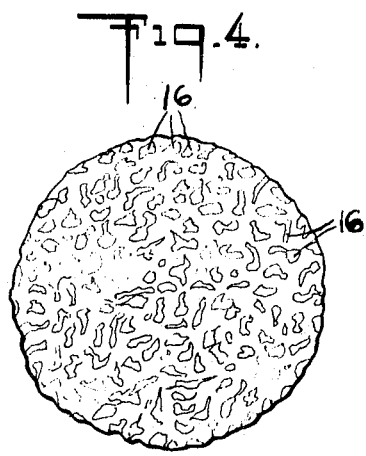
INVENTORS:
GUY J. CROCKER
FRANK PUSKADI
BY
Charles A. Harris
ATTORNEY

PRINTABLE ADHESIVE PRODUCT

The present invention relates to normally tacky and pressure-sensitive sheets and tapes, more particularly to such tapes which comprise a layer of a pressure-sensitive adhesive coated on one side of a thin, flexible backing material, such as a substantially nonporous backing film or sheet of cellulose acetate, regenerated cellulose, polyethylene terephthalate, coated paper, etc., or a porous material such as creped paper or the like, which are printed or adapted to be printed on the other side of the backing.

Pressure-sensitive adhesive tapes are generally manufactured and sold with the tape wound upon itself in convolutions to form a roll. Consequently, when it is necessary to use the tape, it must be possible to unwind the desired length from the roll without excessive force or without delamination of the backing, offsetting of the adhesive, or the like, regardless of the time or conditions under which the tape has remained in roll form prior to use.

For these reasons, a coating known as a release coat is required on the back surface of the tape for the purpose of controlling the force required to unwind the roll. In the tape roll the adhesive of one layer of tape comes into direct contact with the back surface of the next layer down in the roll. Without the release coat on the back surface, the adhesive would come into direct contact with the backing, and the natures of the backing and adhesive are generally such that an excessively strong adhesive bond would eventually develop between them and an excessive amount of force would be required to unwind the roll. This is particularly true of paper masking tapes, the backings of which consist of a porous creped paper impregnated with a rubbery composition to bond together the paper fibers. In such a tape, the rubber in the pressure-sensitive adhesive and the rubber in the backing flow together rather quickly as the tape roll ages, if no release coat is present, and the force required to unwind the roll is so great that it generally results in splitting of the paper backing, rendering the tape useless.

Prior art release coats and release coating systems are described in some detail in copending U.S. Pat. application Ser. No. 678,467 of Guy J. Crocker, filed Aug. 31, 1967, and now U.S. Pat. No. 3,502,497, as are the stringent requirements for such coatings and the defects exhibited by many of the prior art expedients which have been proposed for this purpose. The release coating must be such that it allows the tape to be unwound easily from the roll without, at the same time, detackifying the adhesive. This property is measured in terms of the amount of force necessary to unwind the tape, and a tape which can be unwound easily in this manner is said to possess low unwind adhesion. The problem is in obtaining and maintaining the desired level of unwind adhesion.

One of the greatest defects of prior art release coats has been the loss of release properties on aging. With many of the prior art release materials, the amount applied must be very carefully controlled at a precise level to obtain the desired properties even temporarily. These difficulties will be understood when it is realized that pressure-sensitive adhesives necessarily are semiliquid in nature and usually heterogeneous in their phase structure, especially at the surface contacting the release coat. The tape backing, itself, may be a mixture of elastomers and other materials. As a result, a paper masking tape, for instance, may easily include 20 to 30 separate ingredients in its 6 or 8 mils of thickness, each with a definite purpose. Due to the semiliquid character of the main part of the structure, it follows that diffusion and migration from place to place occur in storage of tape over extended periods.

In order to provide the desired level of initially low unwind adhesion and to provide a factor of safety which will assure that the desired level is maintained over the life of the tape, the release properties of the release or backsize coating must be pronounced and reasonably predictable. Generally speaking, the release agent, i.e., the material or constituent which contributes release properties to the release coating, should be of a type which is considered to provide easy release. Certain polymeric release agents based predominantly upon units having long side chains, i.e., alkyl groups having at least 16 carbon atoms in a straight chain, have been found to be particularly suitable for this purpose. One such release agent which has been found to be vastly superior to any others for this and other purposes, is the copolymer of stearyl methacrylate and acrylonitrile disclosed in the above referred to copending U.S. Pat. application Ser. No. 678,467. It is the principle object of this invention, however, to accomplish a result which appears to be the antithesis of attaining high release properties or low unwind adhesion as just described. It is the main object of this invention to provide a tape which possesses both the properties of:

1. low unwind adhesion, on the one hand; and
2. printability on the very release surface which provides the low unwind adhesion. What is more, this printability must be such that the tape may be unwound easily from the roll, due to its low unwind adhesion; printed on the release surface with a common flexographic ink or some other type of polymeric ink impression; rewound in the form of a roll with the printed indicia in contact with the adhesive underside of the tape; and then unwound from the roll without offsetting or transfer of the ink onto the adhesive. No prior art adhesive tape possesses these properties.

As explained in the above referred to copending U.S. Pat. application Ser. No. 678,467, the release agent may be applied directly to the tape backing or it may be mixed in a release coating composition which includes a film former or some other material to facilitate coating, fill in the rugosities of the backing, or otherwise modify the release material or the properties of the backing. An example of the latter method is described in Holtz U.S. Letters Pat. No. 2,914,167.

There is no known method of applying the above described long side chain, high release, release agent materials directly on the backing in such a way that the coated surface will be printable, as described. Similarly, the prior art does not disclose or suggest the application of release coating compositions wherein such long chain release agents are mixed with another material, such as a film former, to provide printable release coating for pressure-sensitive adhesive tapes. As explained in the above described U.S. Pat. application Ser. No. 678,467, it is theorized that when such release agents are mixed with a film former in this way, the release agent blushes or blooms to the back surface of the release coating in the course of drying, thus forming, in effect, a double coating with only one coating operation. Normally, one would assume that either the release agent would bloom to the surface and cover the film former to provide a tape which possesses low unwind properties and is not printable, or the release agent would not bloom to the surface sufficiently to provide the desired release properties and the coating would be printable if the film former is printable.

We have discovered that long side chain release agent polymers, of the type described generally above and in more detail hereinafter, may be mixed with printable film formers in a way which will provide both printability and low unwind adhesion. The film former must be selected from materials which are incompatible with the release agent in the dry state of the release coating composition, but sufficiently compatible therewith in solution to allow the release coating composition to be coated on the backing without gross separation of the release agent from the film forming composition during coating. Furthermore, the release agent and the printable film former must be such that one portion of the release agent separates from solution with the film former and blooms to the outer surface of the release coating in such a way as to enter into a stable phase relationship with the film former wherein both the release agent and the printable film former are effectively distributed at the outer surface of the tape in a substantially uniform and macroscopically continuous manner. When this occurs, the outer surface of the release coating is both printable and releasable easily from the adhesive layer. In other words, when this phase relationship is established, the printable film former and the release agent each act as if they are continuously present on the outer surface of the tape. The exact surface relationship between the film former and the release agent in this case is not known. It is possible that the release agent is exposed throughout the area of the printable surface in a multiplicity of microscopic and minutely spaced release areas which together contribute the desired release properties; and that the printable film former also is exposed throughout the area of the release coating, but between these release areas, to contribute the desired printability.

This relationship is achieved in tapes according to this invention when the release coating comprises a polymeric film former which is normally printable and adapted to adhere to the backing when coated thereon, and about 1 to 15 parts by weight per hundred parts of the release coating composition of a release agent polymer comprising at least about 50 percent by weight of units having essentially the following structure:

in which units:

$R_1$ is hydrogen or $CH_3$, $R_2$ is $-O-\underset{\underset{O}{\|}}{C}-R_3$, $-\underset{\underset{O}{\|}}{C}-O-R_3$ or $R_3$, $R_3$ is an alkyl group having at least 16 carbon atoms in a straight chain, and $R_4$ is $-COOH$, $R_1$ or $R_2$;

As indicated hereinbefore, a release agent based upon a copolymer of stearyl methacrylate and acrylonitrile in proportions ranging from about 50 parts by weight of stearyl methacrylate and 50 parts by weight of acrylonitrile to about 80 parts by weight of stearyl methacrylate and 20 parts by weight of acrylonitrile, is particularly suitable for this purpose and, in fact, vastly superior to any other release agent. For best results, it is preferred that this release agent possess a methanol insoluble fraction of the release agent polymer possesses a number average molecular weight of between about 1,000 and 25,000; preferably between about 2,000 and 12,000. Other release polymers conforming to the above definition also may be employed. These include the copolymers of stearyl methacrylate and acrylic acid; stearyl methacrylate, acrylic acid and acrylonitrile; stearyl maleate and vinyl acetate; and the like.

The film former of the release coating composition of this invention must possess all of the following properties:

1. It must be adapted to adhere firmly to the backing;
2. It must be sufficiently compatible in solution with the release agent to form a composition which is coatable on the backing without gross separation;
3. It must be incompatible with the release agent after drying, i.e., so that a portion of the release agent blooms to the outer surface of the release coating during drying, leaving the remaining portion of the release agent dissolved in the film former in the dry state of the release coating composition;
4. It must be normally printable with the ink of choice, i.e., with common flexographic inks for general purpose printable tapes; and
5. It must be adapted to enter into a stable phase relationship, with that portion of the release agent which blooms to the outer surface of the tape, wherein both the release agent and the printable film former are effectively distributed at the outer surface, or back surface, of the tape in a substantially uniform and macroscopically continuous manner.

It is this stable phase relationship wherein the release agent and the film former both are effectively distributed at the outer surface of the tape in a substantially uniform and macroscopically continuous manner which makes it possible for the tape to have easy release from the roll while at the same time being printable. In order to achieve this relationship, the proportions of the release agent and the film former in the release coating composition must be closely controlled although they will vary with the particular release agent and film former used as well as with the way these materials are formulated with one another and with the other constituents of the release coating composition.

In general, the release agent polymer may be present in the release coating composition in an amount falling within the broad range of about 1—15 percent by weight of the solids of the composition, which is equivalent to about 1—15 percent by weight of the dry release coating. It also is generally true that the film former and the release agent copolymer are respectively present as major and minor proportions of the release coating composition. However, the ideal range for any given combination of materials normally will be much sharper than this and will fall nearer the low end of this broad range for thin release coatings, i.e., those weighing about 0.001 or 0.002—0.01 ounces per square yard, and towards the high end of this range for thicker release coatings, i.e., about 0.01- —1.00 ounces per square yard. The latter includes the range of about 0.05—1.00 ounces per square yard which has been found most suitable for coating porous fibrous backings to form printed paper pressure-sensitive adhesive tapes according to this invention.

Various film formers may be used in the tape of this invention but the choice of material for this purpose is limited, not only by the above five criteria, per se, but also by the desirability of achieving the widest possible versatility for use with different backing materials, different inks and the like.

The inks which may be printed on the release surface of the tape of this invention generally fall into two main categories, i.e., common flexographic inks and vinyl inks. of these, only the common flexographic inks are presently of primary importance. The reasons for this will be explained hereinafter. Flexographic inks are those used in a flexographic process wherein the ink is printed from a rotary drum covered by relief plates of a flexible material, such as rubber. This type of equipment is intended for fast economical operation and, for this reason, the flexographic inks must be highly fluid volatile inks which dry rapidly and do not attack the rubber of the plates. The common flexographic inks normally are based either on nitrocellulose or a polyamide. There are various types of nitrocellulose inks, many of which include other materials such as acrylates, and the like, which may be combined with the nitrocellulose and/or certain other additives and then diluted in a low boiling solvent such as alcohol to provide an ink which will dry rapidly yet will not attack rubber. The polyamide flexographic inks also are alcohol reducible. The vinyl inks, on the other hand, are prepared with high boiling solvents which would attack most rubber printing plates and require high drying temperatures along with reduced printing speeds. Because of these limitations, vinyl inks are not normally used in flexographic processes and are not normally desirable for printing pressure-sensitive adhesive tapes because of the slow printing speeds which must be used. However, for certain purposes, vinyl inks based on polymers of vinyl chloride and/or vinyl acetate with additives such as resin acid esters, beeswax, and the like, may be used, especially with vinyl film backings.

For generally nonporous filmic sheets and particularly hydrophobic film backings such as polyester films of materials typified by polyethylene terephthalate, polyester film formers are preferred. These include polyethylene and polypropylene terephthalate and isophthalate, glycerol terephthalate, polyethylene and polypropylene sebacate and glycerol sebacate, and like polyesters normally formed by condensation polymerization. One polyester which is particularly suitable as a film former for polyester film of the Mylar type is Vitel 207, manufactured by Goodyear Tire and Rubber Co., which is believed to be a polymeric mixture or copolymer of polypropylene and glycerol terephthalate and polypropylene and glycerol sebacate. Generally speaking, polyesters comprising a major proportion of polyethylene or polypropylene terephthalate or isophthalate are preferred.

When this Vitel 207 film former is combined with the preferred release agent of this invention, i.e., the copolymer of stearyl methacrylate and acrylonitrile having at least 20 percent acrylonitrile, for release coating Mylar film and the like; both ideal printability with common flexographic inks and easy release are attained economically when the amount of release agent copolymer in the release coating composition is in the neighborhood of about 8—15 percent by weight of solids and the release composition is applied at a dry coating weight of about 0.01—0.016 ounces per square yard.

A preferred type of film former to be used for coating porous fibrous backing sheets, such as creped saturating paper, to provide pressure-sensitive adhesive tapes printable with common flexographic inks, is based on an acrylate polymer adapted to be applied in an aqueous system which may be heat cured if desired. For instance, Ubatol-7005, manufactured by U.B.S. Chemical Co., a division of A. E. Staley Manufacturing Co., an emulsion terpolymer of about 67 parts ethyl acrylate, 30 parts styrene and 3 parts methacrylic acid has been found to be quite satisfactory for this purpose when formulated preferred a water dispersible phenol formaldehyde curing resin and Applicants' preferred release agent copolymer of stearyl methacrylate and acrylonitrile to form the release coating composition. Lower alkyl acrylate copolymers of this type with styrene and even a small amount of acrylonitrile, or a similar polymer, give good results in coating paper backings according to the present invention.

A vinyl film former which has been found to be particularly suitable for use with vinyl inks in accordance with this invention is T-24-9 resin, sold by the Bakelite Corporation, a copolymer of vinyl acetate and a relatively small proportion of vinyl alcohol. The vinyl alcohol may be present in the range of about 8—9.5 parts by weight of the total solids for the purpose of providing hydroxyl modification. While this particular film former is only suitable for vinyl inks, it may be modified with a relatively small amount of an isocyanate complex to render it suitable for printing with common flexographic inks. This type of film former, either with or without the isocyanate modification, may be applied to relatively dense backing sheets such as polyester films, or to porous paper backing with good results.

Other features and advantages of this invention will appear to one skilled in the art from the following description, examples and claims taken together with the drawings wherein:

FIG. 1 is an enlarged schematic sectional view through the thickness of one embodiment of a printed pressure-sensitive adhesive tape according to this invention.

FIG. 2 is a more greatly enlarged schematic partial sectional view of the portion roughly shown within the circle in FIG. 1.

FIG. 3 is a very greatly enlarged schematic partial sectional view of a portion of that part shown within the circle in FIG. 2.

FIG. 4 is a schematic plan view of the release surface of the tape of the foregoing FIGS. looking down at the top of FIG. 3 and at about the same enlargement as FIG. 3.

Referring to the drawings, there is shown a pressure-sensitive adhesive tape 11 according to one embodiment of this invention which comprises a backing film 12 coated on one major surface with a pressure-sensitive adhesive composition to provide a pressure-sensitive, i.e., normally tacky, adhesive layer 13; and, on the other major surface, with a release coat, or coating 14 to provide a printable release surface 15. As described hereinbefore, the release coat 14 is formed by coating one surface of the backing film 12 with a release coating composition which comprises a film former and a release agent copolymer. One portion of the release agent remains dissolved in the film former and the other portion of the release agent separates from solution with the film former in the dry state of the release coating composition. This separated portion of the release agent blooms to the outer surface of the release coat and enters into a stable phase relationship with the film former adjacent the outer surface of the coating. In this phase relationship, both the release agent and the film former are effectively distributed at said surface in a substantially uniform and macroscopically continuous manner with the result that both printability and easy release are provided. This surface portion of the release coating wherein the release agent and the film former are in the said stable phase relationship is represented by the portion of the release coating above the line M–M in FIGS. 2 and 3 and the outer surface of this portion is the printable release surface 15. The exact surface relationship between the film former and the release agent is not known. As indicated hereinbefore, it is possible that the release agent is exposed throughout the area of the printable release surface in a multiplicity of microscopic and minutely spaced release areas 16 which together contribute the desired release properties; and that the printable film former also is exposed throughout the area of the release coating, but between the release areas 16, to contribute the desired printability.

At any rate, when the printable release surface 15 of the backing of the pressure-sensitive adhesive tape of this embodiment is printed with a suitable ink which otherwise would be printable on a sheet of the film former, itself, the ink impressions 17 which are formed will adhere firmly to the release surface. In fact, the tape may be rewound upon itself after printing in such a way that the adhesive layer of the tape contacts the ink impressions 17 and the release surface 15 between them, and then unwound without any offsetting of the adhesive or transfer of the ink to the adhesive layer or otherwise disrupting or interfering with the clarity of the printing.

The following are specific examples illustrating various embodiments of this invention. All data is given in parts by weight unless otherwise indicated:

EXAMPLE I

A series of 10 release coating compositions according to this invention are formulated in accordance with the following table:

| Release composition | 1 | 2 | 3 | 4 | 5 | 6 | 7 | 8 | 9 | 10 |
|---|---|---|---|---|---|---|---|---|---|---|
| Vitel-207 polyester film former | 7.5 | 7.5 | 7.5 | 7.5 | 7.5 | 7.5 | 7.5 | 7.5 | 7.5 | 7.5 |
| Release agent A | 1.25 | 1.1 | 1.0 | .9 | .75 | .6 | .5 | .4 | .25 | |
| Methyl ethyl ketone | 102.5 | 102.5 | 102.5 | 102.5 | 102.5 | 102.5 | 102.5 | 102.5 | 102.5 | 102.5 |
| Toluene | 3.75 | 3.3 | 3.0 | 2.7 | 2.25 | 1.8 | 1.5 | 1.2 | .75 | |
| Unwind adhesion, oz./in. width | 21.0 | 31.0 | 37.0 | 7.0 | 10.0 | 17.0 | 20.0 | 23.0 | 33.0 | 82.0 |

Release coating compositions 1, 2 and 3 are coated onto a 2 mil Mylar polyester backing film at a coating speed of 16 feet per minute using a No. 12 Meier rod and then dried in two stages at 180° and 280° F., respectively, to evaporate the solvents and give a dry coating weight of approximately 0.017 oz/sq. yd. Release coating compositions 4 through 10 also are coated at 16 feet per minute, but using a No. 3 Meier rod and drying temperatures of 180° and 350° F. The result is a dried release coat weighing approximately 0.005 oz/sq. yd.

All of the above 10 coated backings then are primed on their opposite surfaces with a primer composition based on a combination of a butadiene-acrylonitrile copolymer and natural rubber as described in U.S. Letters Pat. No. 2,647,843 at approximately the same speed and temperatures as are used for release coats 1, 2 and 3 at a dry coating weight of approximately 0.007 oz/sq. yd. After the primer is dried, it is coated at the same speed with the following pressure-sensitive Adhesive Mass-A:

Adhesive Mass-A

| Constituent: | Parts |
| --- | --- |
| Pale crepe rubber | 100 |
| Piccolyte S 115 (betapinene resin) | 65 |
| Urea formaldehyde resin | 10 |
| Antioxidant | 2 |
| Para-toluene sulfonic acid | 2 |

This mass is applied at about 180° F. and dried at approximately 315° F. in such a way as to provide a pressure-sensitive adhesive layer weighing approximately 2 oz/sq. yd.

The resulting pressure-sensitive adhesive sheets are slit into sample tapes one inch wide and wound upon themselves to form rolls with the adhesive side of the tape facing inwardly. The rolls then are tested for unwind adhesion with the results indicated in the last horizontal column of the above table. Whenever the term "unwind adhesion" is used in this application in referring to a tape or sheet, it shall mean the force in ounces per inch of width required to unwind the tape or sheet at 75 feet per minute while drawing the end thereof radially away from a roll of the tape or sheet wound upon itself and mounted on a free-turning mandrel. The outer surface of the release coating, i.e., the release surface, of each of the samples is printed by a flexographic technique with Gotham-Ethalin 19-458 flexographic ink to form polymeric ink impressions which are firmly adhered to the release surface of the tape. This ink is believed to consist of nitrocellulose and a polyester plasticizer as the main constituents, as well as resin acid and a small amount of a microcrystalline wax. It is reducible with a 1 to 1 mixture of alcohol and ethyl acetate. The resulting printed pressure-sensitive adhesive tape than is rewound upon itself in the form of a roll with its adhesive layer in contact with the release surface and the ink impressions presented thereby. When it is desired to use the printed tape by withdrawing it from the roll, for samples 1 through 3 and 6 through 9, it may again be unwound easily with no transfer of the ink to the adhesive layer. There is a very slight amount of ink transfer for the samples made using the release coating compositions 4 and 5. This indicates that there is slightly too much release agent present in the composition for the release coating thickness and the drying temperatures applied thereto. It will be seen that when the thickness of the release coating is increased substantially and the ultimate drying temperature is decreased, as for samples 1 through 3, very satisfactory printability is obtained, i.e., no ink transfer, with much higher proportions of release agent in the composition.

The Vitel-207 polyester film former is that manufactured by Goodyear Tire and Rubber Company and described hereinbefore. It possesses a specific gravity of approximately 1.215 and an intrinsic viscosity of about 0.775. Its softening point is approximately 250° F. Release Agent A is Applicants' preferred release agent copolymer which comprises approximately 55 parts stearyl methacrylate and 45 parts acrylonitrile and possesses a methanol insoluble fraction having a number average molecular weight of approximately 8,000.

EXAMPLE II

Release coating composition No. 4 of example I this time is applied to a 2 mil Mylar polyester film using a No. 9 Meier rod at a coating weight of approximately 0.013 oz/sq. yd. at the same coating and drying temperatures and the same speed as it was applied in example I. This time, however, the resulting pressure-sensitive adhesive tape possesses good printability with the Gotham 19-458 flexographic ink of example I, as well as excellent unwind properties.

EXAMPLE III

The following backsize or release coating compositions are formulated as follows from another film former of this invention:

| Release composition | 11 | 12 |
| --- | --- | --- |
| T-24-9 Resin | 21.5 | 21.5 |
| Release Agent A | 3.5 | 3.5 |
| Toluene | 126.0 | 126.0 |
| Methyl ethyl ketone | 20.0 | 20.0 |
| Isocyanate complex | 0 | 0.5 |

AThe T-24-9 Resin is a film former offered by Bakelite Division of Union Carbide Corporation and is a copolymer of vinyl acetate and 8—9.5 percent by weight of the polymer solids of vinyl alcohol, to provide hydroxyl modification thereto. The isocyanate complex may be RC-805 sold by E. I. DuPont de Nemours. Both of these release compositions are applied to a Mylar polyester film and processed into a pressure-sensitive adhesive tape as described in example I, except that the composition is coated at a dry weight of approximately 0.015 oz/sq. yd. and then dried at approximately 300° F.

Both tapes release easily from the rolls in which they are wound after slitting. Release composition No. 11 is printable with vinyl inks only, whereas release composition No. 12 also is printable with various flexographic inks, such as Gotham Gothalin Label inks, with no ink transfer upon contact with the adhesive layer of the tape and removal therefrom.

EXAMPLE IV

Release composition No. 11 of example III is modified so that is contains only about 76 parts toluene and 10 parts methyl ethyl ketone and then is applied to one major surface of a creped bleached kraft backing sheet which previously had been unified by impregnation and curing as described in U.S. Letters Pat. No. 2,848,355. The resulting coated sheet then is coated on the other side with the following Adhesive Mass Formulation-B:

Adhesive Mass-B

| Constituent: | Parts |
| --- | --- |
| Pale crepe rubber | 100 |
| Diethyleneglycol ester of dehydroabietic acid | 100 |
| Para-octyl phenol formaldehyde curing resin | 20 |
| Zinc oxide | 50 |
| Antioxidant | 2 |

After the adhesive layer is dried and cured as described in U.S. Letters Pat. No. 2,999,769, to give a dry coated weight of approximately 1.25 ounces per square yard, the sheet is slit into tapes which are wound upon themselves to form rolls. These tapes possess easy unwind properties and good printability with vinyl inks.

EXAMPLE V

Still another release coating composition of this invention is formulated as follows:

| Release composition | 13 |
| --- | --- |
| T-24-9 Resin | 6 |
| Vitel 207 polyester film former | 31.5 |
| Release agent A | 5.0 |
| Methyl ethyl ketone | 494.5 |
| Toluene | 31.1 |

This release composition was coated on Mylar polyester film as described in example III and then processed into a pressure-sensitive adhesive tape, as set forth in example I, with excellent results both as to release and printability with flexographic inks.

EXAMPLE VI

The creped kraft unified paper backing described in example IV is coated on one of its major surfaces with the following release composition:

| Release composition | 14 |
| --- | --- |
| Ubatol-7005 film former | 150 |
| Release agent A | 6.25 |
| Durez-Resin 14798 | 10 |
| Ammonium hydroxide | 0.5 |
| Toluene | 18.75 |
| Water | 199.5 |

As indicated hereinbefore, the Ubatol-7005 is an emulsion copolymer of about 70 parts ethyl acrylate and 30 parts styrene normally supplied at about 50 percent solids in water. However, only solids have been indicated in the above formulation. Durez-Resin 14798 is a water dispersible phenol formaldehyde resin supplied by Hooker Chemical Company as a 65 percent solution in water. In preparing the above formulation, the Durez resin first is added to water and then the ammonium hydroxide and release agent copolymer are mixed thoroughly therewith. This mixture then is gradually added to the Ubatol film former with continuous mixing to obtain a uniform dispersion.

The release composition is coated on the backing at a speed of approximately 100 feet per minute with temperatures ranging between 100°—200° F., using an air knife, and then dried at approximately 400° F. The opposite surface of the sheet then is coated with Adhesive Mass-B as in example IV and slit into tapes which are wound upon themselves. The resulting tapes possess excellent unwind properties and are printable with common flexographic inks such as those described in examples I and III.

Having now described the invention in specific detail and exemplified the manner in which it may be carried into practice, it will be readily apparent to those skilled in the art that innumerable variations, modifications, applications, and extensions of the basic principles involved may be made without departing from its spirit or scope.

We claim:

1. A normally tacky and pressure-sensitive adhesive tape roll which comprises a flexible backing; a normally tacky and pressure-sensitive adhesive composition coated on one major surface of the backing to form a normally tacky and pressure-sensitive adhesive layer; a release coating composition coated on the opposite major surface of said backing to form a release coating presenting a printable release surface, and printed polymeric ink impressions firmly adhered to said printable release surface, said tape being wound upon itself in roll form in successive convolutions with the adhesive layer of one convolution in contact with the release coating of the contiguous convolution and the ink impressions printed thereon; said release coating composition comprising a major proportion of a polymeric film former normally printable and adapted to adhere to said backing when coated thereon and a minor proportion of a release agent polymer comprising at least about 50 percent by weight of units having essentially the following structure:

in which units:

$R_1$ is hydrogen or $CH_3$, $R_2$ is $-O-\underset{\underset{O}{\|}}{C}-R_3$, $-\underset{\underset{O}{\|}}{C}-O-R_3$ or $R_3$, $R_3$ is an alkyl group having at least 16 carbon atoms in a straight chain, and $R_4$ is $-COOH$, $R_1$ or $R_2$;

said release agent being incompatible with said film former in the dry state of said release coating composition but sufficiently compatible therewith in solution to allow the release coating composition to be coated on the backing without gross separation of the release agent from the film former during coating, one portion of said release agent remaining dissolved in said film former in the dry state of said release coating composition and the other portion of said release agent separating from solution with said film former in said dry state, the separated portion of said release agent blooming to the outer surface of the release coating and entering into a stable phase relationship with the film former adjacent said outer surface wherein both the release agent and the film former are effectively distributed at said surface in a substantially uniform and macroscopically continuous manner, said release surface possessing easy release properties from said adhesive layer yet being uniformly printable with inks normally printable on said film former; and the tape bearing said ink impressions being adapted to be unwound from the roll without offsetting of the ink onto said adhesive.

2. A normally tacky and pressure-sensitive adhesive tape according to claim 1, wherein said release agent polymer is present in the amount of about 1—15 parts by weight per hundred parts of the release coating composition and the remainder of said composition consists essentially of said film former.

3. A normally tacky and pressure-sensitive adhesive tape according to claim 2, wherein said backing is a substantially nonporous filmic sheet and said film former consists essentially of a polyester comprising a major proportion of polyethylene or polypropylene terephthalate or isophthalate.

4. A normally tacky and pressure-sensitive adhesive tape according to claim 3, wherein the release coating composition is applied to the backing at a dry coating weight of about 0.01-—0.016 ounce per square yard.

5. A normally tacky and pressure-sensitive adhesive tape according to claim 2, wherein the film former consists essentially of a hydroxyl modified vinyl copolymer.

6. A normally tacky and pressure-sensitive adhesive tape according to claim 2, wherein the film former consists essentially of a lower alkyl acrylate copolymer.

7. A normally tacky and pressure-sensitive adhesive tape which comprises a flexible backing; a normally tacky and pressure-sensitive adhesive composition coated on one major surface of the backing to form a normally tacky and pressure-sensitive adhesive layer; and a release coating composition coated on the opposite major surface of said backing to form a release coating presenting a printable release surface, said tape being adapted to be wound upon itself in roll form in successive convolutions with the adhesive layer of one convolution in contact with the release coating of the contiguous convolution; said release coating composition comprising a polymeric film former normally printable and adapted to adhere to said backing when coated thereon, said film former consisting essentially of a material selected from the group consisting of polyesters comprising a major proportion of polyethylene or polypropylene terephthalate or isophthalate, hydroxyl modified vinyl acetate polymers, and lower alkyl acrylate copolymers, and about 1—15 parts by weight per 100 parts of the film former of a release agent polymer comprising at least about 50 percent by weight of units having essentially the following structure:

in which units:

$R_1$ is hydrogen or $CH_3$, $R_2$ is $-O-\underset{\underset{O}{\|}}{C}-R_3$, $-\underset{\underset{O}{\|}}{C}-O-R_3$ or $R_3$, $R_3$ is an alkyl group having at least 16 carbon atoms in a straight chain, and $R_4$ is $-COOH$, $R_1$ or $R_2$;

Asaid release agent being incompatible with said film former in the dry state of said release coating composition but sufficiently compatible therewith in solution to allow the release coating composition to be coated on the backing without gross separation of the release agent from the film former during coating, one portion of said release agent remaining dissolved in said film former in the dry state of said release coating composition and the other portion of said release agent separating from solution with said film former in said dry state, the separated portion of said release agent blooming to the outer surface of the release coating and entering into a stable phase relationship with the film former adjacent said outer surface wherein both the release agent and the film former are effectively distributed at said surface in a substantially uniform and macroscopically continuous manner; said release surface possessing easy release properties from said adhesive layer yet being uniformly printable with inks normally printable on said film former.